(12) United States Patent
Ganem

(10) Patent No.: US 9,455,971 B2
(45) Date of Patent: Sep. 27, 2016

(54) METHOD FOR USING A REMOTE SECURE DEVICE TO AUTHENTICATE A CLIENT DEVICE TO ACCESS A REMOTE SERVICE

(75) Inventor: Herve Ganem, Villejuif (FR)

(73) Assignee: GEMALTO SA, Meudon (FR)

(*) Notice: Subject to any disclaimer, the term of this patent is extended or adjusted under 35 U.S.C. 154(b) by 0 days.

(21) Appl. No.: 13/990,424

(22) PCT Filed: Nov. 18, 2011

(86) PCT No.: PCT/EP2011/070495
§ 371 (c)(1),
(2), (4) Date: May 30, 2013

(87) PCT Pub. No.: WO2012/072429
PCT Pub. Date: Jun. 7, 2012

(65) Prior Publication Data
US 2013/0254846 A1    Sep. 26, 2013

(30) Foreign Application Priority Data

Nov. 30, 2010  (EP) .................................... 10306319

(51) Int. Cl.
*H04L 29/06* (2006.01)
*G06F 21/34* (2013.01)
(Continued)

(52) U.S. Cl.
CPC ............... *H04L 63/08* (2013.01); *G06F 21/34* (2013.01); *G06F 21/606* (2013.01); *H04L 63/0869* (2013.01); *H04L 63/0884* (2013.01); *H04M 1/7253* (2013.01); *G06F 2221/2153* (2013.01); *H04L 63/10* (2013.01); *H04L 65/1016* (2013.01)

(58) Field of Classification Search
CPC ........ G06F 21/35; G06F 21/43; G06F 21/34; G06F 21/606; G06F 2221/2153; H04W 12/06; H04L 63/0869; H04L 63/0853; H04L 2463/082; H04L 63/08; H04L 63/0884; H04L 65/1016; H04L 63/10; H04M 1/7253
USPC .......................................................... 726/3, 7
See application file for complete search history.

(56) References Cited

U.S. PATENT DOCUMENTS

| 2003/0005117 A1* | 1/2003 | Kang et al. ................... 709/225 |
| 2004/0249891 A1* | 12/2004 | Khartabil et al. ............ 709/206 |
| 2006/0165060 A1* | 7/2006 | Dua .............................. 370/352 |

(Continued)

FOREIGN PATENT DOCUMENTS

| EP | 1903466 A1 | 3/2008 |
| WO | WO2009141919 A1 | 11/2009 |

OTHER PUBLICATIONS

PCT/EP2011/070495 International Search Report, Dec. 20, 2011, European Patent Office, P.B. 5818 Patentlaan 2 NL—2280 HV Rijswijk.

(Continued)

*Primary Examiner* — Don Zhao
(74) *Attorney, Agent, or Firm* — The Jansson Firm; Pehr Jansson

(57) ABSTRACT

The invention relates to a method for a client device (2) to access to remote secure data on a remote secure device (1), said secure data being associated to a remote service, characterized in that it comprises creating a secure peer to peer channel (3) between a client application (21) of a client device and said remote secure device so as the client device and the remote secure device exchange data (4) securely and bidirectionally.

15 Claims, 1 Drawing Sheet

(51) Int. Cl.
    *G06F 21/60*    (2013.01)
    *H04M 1/725*    (2006.01)

(56)             References Cited

U.S. PATENT DOCUMENTS

2006/0206709 A1*   9/2006   Labrou et al. ................ 713/167
2008/0212499 A1*   9/2008   Maes ............................ 370/265
2008/0235511 A1*   9/2008   O'Brien et al. .............. 713/171
2009/0125595 A1*   5/2009   Maes ............................ 709/206
2009/0132717 A1*   5/2009   Maes ............................ 709/228
2009/0182919 A1*   7/2009   Chang et al. ................. 710/106
2009/0304009 A1*   12/2009  Kolhi et al. .................. 370/400
2010/0100945 A1*   4/2010   Ozzie et al. ...................... 726/5
2010/0172344 A1*   7/2010   Yin et al. ..................... 370/352
2010/0210240 A1*   8/2010   Mahaffey et al. ............ 455/411

OTHER PUBLICATIONS

PCT/EP2011/070495 Written Opinion of the International Searching Authority, Dec. 20, 2011, European Patent Office, P.B. 5818 Patentlaan 2 NL—2280 HV Rijswijk.

* cited by examiner

METHOD FOR USING A REMOTE SECURE DEVICE TO AUTHENTICATE A CLIENT DEVICE TO ACCESS A REMOTE SERVICE

FIELD OF THE INVENTION

The present invention relates generally to a network use of secure devices and a method for a client device to access to access security services exposed by a network connected secure device.

BACKGROUND OF THE INVENTION

Secure devices have been used for years in applications presenting the need for strong security. The exponential growth of the internet has also had the unfortunate side effect of speeding up the dissemination of malware and facilitating access to malware creation techniques. New threats such as spyware have emerged during last decade, making feasible attacks based upon spying the communications between a host and a smart card, and making necessary to adapt the way secure devices are being used.

A traditional architecture for the use of secure devices involves a local connection of those appliances to a host computer. This computer may be a handset, a PC, and ATM machine, or any other type of device. Generally one secure device is connected to one host computer to secure access to a specific service or application from that host computer. An application is typically executed on the host computer which communicates with the secure device, usually by means of APDU commands whenever needed. Current solutions using a secure element to protect content are based on the concept of one secure element inserted inside a terminal to view content on that same terminal.

The need for a local connection between the secure device and the host computer sometimes creates a problem by limiting the range of devices usable for an application. This problem can go as far as preventing the deployment of application involving smart devices due to the lack of equipment supporting their use.

As an example, in the field of secure IPTV devices, secure devices are on the one hand suitable for content ciphering/deciphering, but on the other hand, there is an emergence and a growth of a nomadicity constraints requiring access to the premium TV content any time, anywhere, from any device (PC, Mobile, TV, game station . . . ). The multiplication of the form factor of viewing devices makes a lot more difficult the large scale deployment of secure devices for content decryption.

In the traditional model, the secure element needs to be physically connected to the host computer in order to secure the service. However different terminals are likely to present sometimes different incompatible connectivity requirements for the secure element, leading to the need to support different form factors which is costly, complex and inconvenient for the user.

It is an object of the invention to provide a method for enabling access to security services exposed by networked secure elements. Thereto, the present invention provides a method for a client device to access to remote secure data on a remote secure device, said secure data being associated to a remote service, characterized in that it comprises creating a secure peer to peer channel between a client application of a client device and said remote secure device so as the client device and the remote secure device exchange data securely and bidirectionally.

According to one aspect of the invention,
the method may comprise transferring a user interface from the remote secure device;
the method may comprise accessing to the remote secure data after an authentication of a user;
the method may comprise using a server for establishing a mutual authentication between the client device and the secure remote device, said server allowing only one user to register at the same time;
the method may comprise using a SIP server, said server allowing only one user to register at the same time at a SIP address;
the method may comprise using a PC or a handset as client device;
the method may comprise building secure IMS applications.

BRIEF DESCRIPTION OF THE DRAWINGS

The various aspects, features and advantages of the invention will become more fully apparent to those having ordinary skill in the art upon careful consideration of the following Detailed Description, given by way of example thereof, with the accompanying drawings described below.

DETAILED DESCRIPTION

The present invention may be understood according to the detailed description provided herein.

Figure 1:
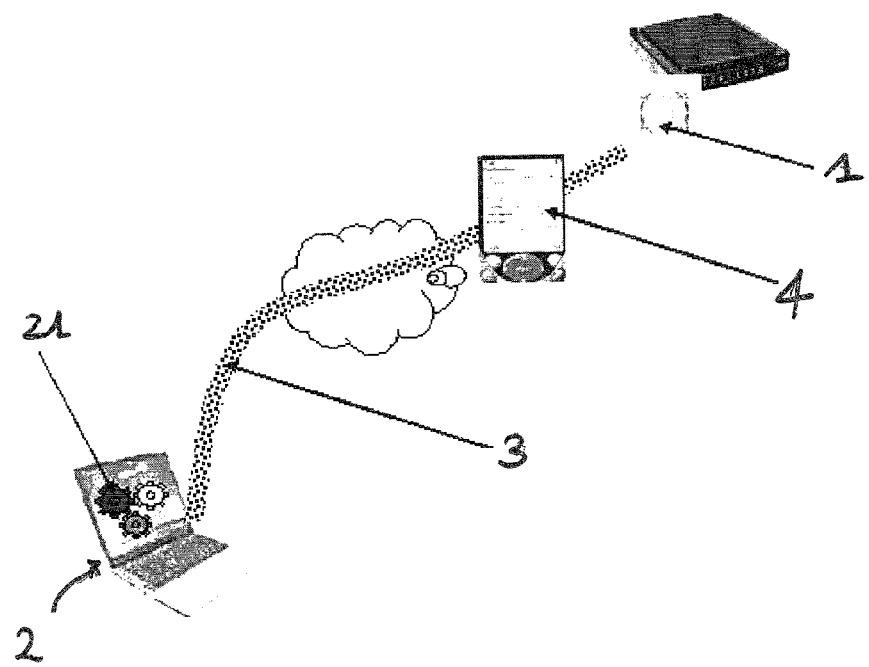
FIG. 1 schematically shows an architecture of an embodiment of the invention.

Shown in FIG. 1 is a secure device 1 featuring IP connectivity and able to execute a server peer application. The IP connectivity may be either native or obtained with the help of a host appliance for example through the use of a client application executed on the host.

A client device 2 such as a client computer allows accessing an end user service to be secured. The client device 2 comprises a client application 21 to be executed on it. A user connects to a service application proposed by a service provided, for example an ADSL box in the user home. This service needs to be secured with the help of the remote secure device 1.

According to the invention, the method comprises creating a secure peer to peer channel 3 between the client application 21 and the remote secure device 1. This channel enables an opaque transfer of data between the two devices. For doing so, the client application 21 running on the client device, setups an encrypted channel 3 in order to be able to communicate securely with the remote device 1. The setup of this encrypted channel 3 may be done either using only server side credentials (such as server side certificates), but it may also require user credentials (for mutual authentication)

The method also comprises a step of creating and transmitting Rich media user interfaces 4 between the secure device 1 and the client application 21 hosted by the client device 2. One or more remote user interfaces 4 are then transferred from the secure device 1 enabling the user to interact with a secure device application 11 on the service provided 12. Those interfaces 4 may be implemented using a rich media standard, such a flash or LASeR enabling the packaging of complex and rich user interfaces as file based applications.

The secure device 1 may advantageously implement different techniques to change dynamically the look of the user interface 4 to make the interface more immune to spying techniques such a key loggers or screen scrapping.

In another step, the user interacts with the remote user interface 4 transferred from the secure device 1 to the client device 2 for authenticating the user for example through the capture of a pin code. It will be well understood that the capture of a pin code is not a limited example and that any other need is possible. The capture of a user interaction at this stage may constitute a second authentication factor if the creation of the secure channel described above has involved a user authentication.

Once the user is authenticated, the remote secure device 1 initiates the cryptographic services requested.

Figure 2:
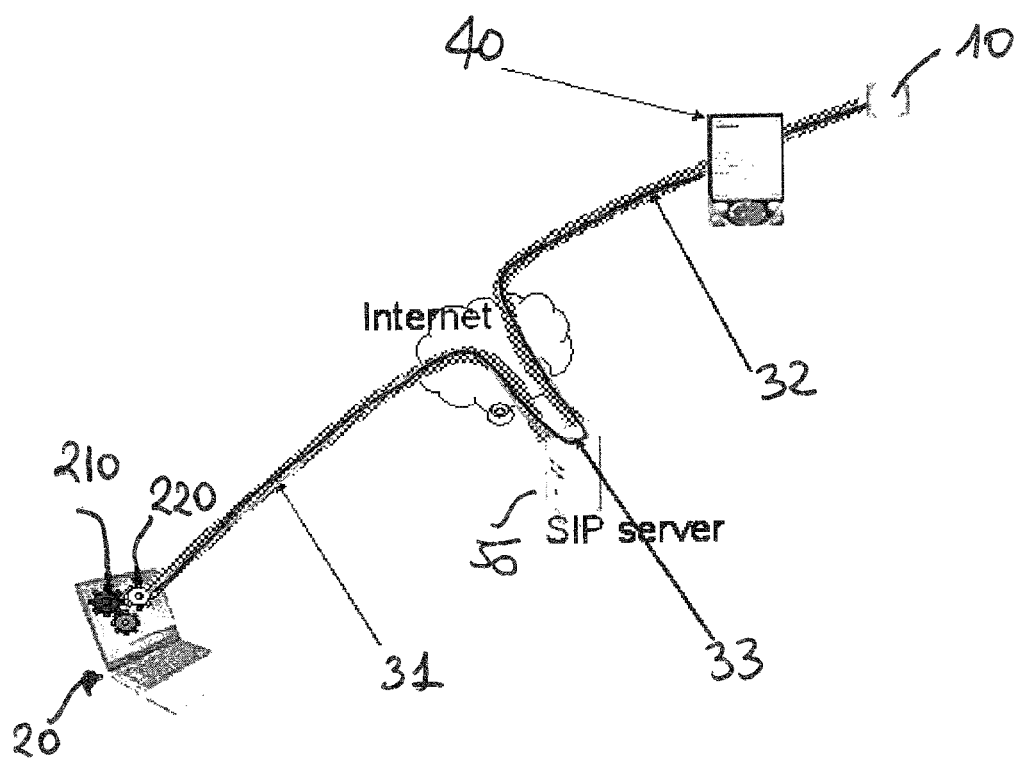
FIG. 2 schematically shows a detailed architecture of another embodiment of the invention.

Shown in FIG. 2 is a detailed embodiment of the method for creating a networked access to an ISIM application. An ISIM application is an UICC application enabling to secure IMS applications 210 such as VOIP or IPTV service.

As represented a laptop computer 20 is used to execute an IMS application 210. Access to the associated IMS service requires the user to login to an IMS network, with the help of the ISIM application. The user login is performed by an IMS stack installed on the laptop. This software layer expects to communicate with the ISIM application installed in a locally connected UICC 10 via a PCSC interface. The remote networked UICC 10 is a UICC with IP communication capabilities as described above.

According to the invention, a user switches on the application such as an IPTV application. This triggers via the IMS stack installed on the PC the setup of an IMS session. The stack performs a registration operation in the IMS network and this registration involves answering a challenge to authenticate the user with the help of the ISIM application.

When the IMS stack receives the challenge, it sends an APDU command such as the AUTHENTICATE APDU to the ISIM application via a virtual PCSC reader 220 which appears as a PCSC reader.

Upon reception of an APDU sent by the IMS stack, the virtual PCSC software layer setup a secure SIP session 31 with a predefined SIP server 50 using a predefined or random SIP address. This SIPS connection is secure only using server side certificate presented by the SIP server 50. Another possibility is to secure this SIP session using mutual authentication using a server side certificate to authenticate the server and username and password to authenticate the user.

The SIP server 50 is configured so that only one user can be registered at the same time at the SIP address.

The remote secure device 10 is also connected to the SIP server 50 by means of a mutual authentication. This mutual authentication decreases advantageously the possibility for an attacker to fake the secure device 10. A SIPS link 32 is then established with client and server authentication.

The virtual PCSC device 220 then setups a MSRP SIPS session 33 with the remote secure device. This data session enables the virtual PCSC device 220 and the remote secure device 110 to exchange data securely and bidirectionally. The secure device is allocated for the exclusive use during the time of the session.

The virtual PCSC device 220 passes the APDUs received from the IMS stack on the laptop via an MSRP session link 33. The answers from the remote secure device 10 are also sent via the same channel. The ISIM challenge and its response transit via the MSRP channel 33.

Any user interface 40 required, such as a user interface to capture a user pin code are for example transmitted as a LASeR rich media scene. HTTP requests are for example transmitted to the remote secure device via the MSRP session data link 33.

The ISIM challenge response received on the user computer is sent back to the IMS network as if had been received from an ISIM application executed in a locally connected UICC.

The user is logged in the IMS network and can subsequently access the IMS service. The use of a networked UICC is transparent for the IMS stack.

The method advantageously enables the networked use of secure devices that can be considered as cryptographic computers.

The invention claimed is:

1. A method to provide access for a user to a remote service application via a client application executing on a client device by using remote secure data on a remote secure device to authenticate the client application to the remote service application, the remote secure data being associated to a remote service, the method comprising:
   establishing a first communications session between the client application and the remote service;
   receiving by the client application an authentication challenge from the remote service;
   transmitting the authentication challenge from the client application to a virtual secure device reader of the client device;
   establishing a second communications session that is a secure channel between the virtual secure device reader and the remote secure device , the second communications session enabling that the client device and the remote secure device exchange data securely and bidirectionally;
   transmitting the authentication challenge from the virtual secure device reader of the client device to the remote secure device;
   transferring a dynamically changing user interface for authenticating the user from the remote secure device to the client device; and
   upon successful authentication of the user to the remote secure device using the transferred interface, operating the remote secure device to answer the authentication challenge using the remote secure data to the virtual secure device reader;
   forwarding an authentication challenge answer from the virtual secure device reader to the remote service via the client application; and
   initiating the remote service upon verifying the authentication challenge answer as an authentication credential to the remote service.

2. The method according to claim 1, further comprising accessing to the remote service after an authentication of the user.

3. The method according to claim 2, further comprising using a server for establishing the second communications session between the virtual secure device reader of the client device and the secure remote device, the server allowing only one user to register at the same time.

4. The method according to claim 2, further comprising using a PC or a handset as client device.

5. The method according to claim 2, further comprising building secure IMS applications.

6. The method according to claim 1, further comprising using a server for establishing the second communications session between the virtual secure device reader of the client device and the secure remote device, the server allowing only one user to register at the same time.

7. The method according to claim 6, wherein the server for establishing the second communications session is a predefined SIP (Session Initiation Protocol) server which allows only the one user to register at the same time at a SIP address.

8. The method according to claim 7, further comprising using a PC or a handset as client device.

9. The method according to claim 7 wherein the remote secure device is also connected to the predefined SIP server by means of a mutual authentication between the SIP and the remote secure device.

10. The method according to claim 9 wherein the virtual secure device reader device passes an authentication challenge from the remote service to the remote secure device and receives answers from the remote secure device over the second communications session.

11. The method according to claim 10 wherein the second communications session is an MSRP (Message Session Relay Protocol) SIP session between the virtual secure device reader device and the remote secure device.

12. The method according to claim 6, further comprising using a PC or a handset as client device.

13. The method according to claim 6, further comprising building secure IMS applications.

14. The method according to claim 1, further comprising using a PC or a handset as client device.

15. The method according to claim 1, further comprising building secure IMS applications.

* * * * *